Sept. 30, 1941.  D. TROMPETER  2,257,580
ELECTRIC COOKING DEVICE
Filed June 16, 1939  3 Sheets-Sheet 1

INVENTOR
David Trompeter
BY
Augustus M. Henry
ATTORNEY

Sept. 30, 1941.  D. TROMPETER  2,257,580
ELECTRIC COOKING DEVICE
Filed June 16, 1939  3 Sheets-Sheet 2

INVENTOR
David Trompeter
BY
Augustus M. Henry
ATTORNEY

Sept. 30, 1941.   D. TROMPETER   2,257,580
ELECTRIC COOKING DEVICE
Filed June 16, 1939   3 Sheets-Sheet 3

INVENTOR
David Trompeter
BY
Augustus M. Henry
ATTORNEY

Patented Sept. 30, 1941

2,257,580

UNITED STATES PATENT OFFICE 2,257,580

ELECTRIC COOKING DEVICE

David Trompeter, Darien, Conn.

Application June 16, 1939, Serial No. 279,415

3 Claims. (Cl. 219—37)

This invention relates to electric cooking stoves.

The invention has been made with the idea of providing such a stove, and one so constructed and operating that the cost of electric current used for any cooking operation will be substantially as low as, if not lower than, the fuel cost in performing the same cooking by manufactured gas or oil. Actual experience has shown, in regard to this feature of the invention, that the electric current cost is about half that of many previously used electric stoves of the same capacity.

Another provision of the invention is an electric stove having the above advantage, and also the advantage that any food to be cooked can be cooked in about one-half the time required in previous stoves of equal wattage.

The nature of this invention is such that it provides, so far as I am aware, the first electric stove in which the cooking heat can be controlled thermostatically.

Moreover, a characteristic of the invention is such that the food being cooked cannot possibly burn.

Furthermore, should any boilable component or associate of the food boil over, the heating element is not affected or wetted therefrom; otherwise stated, there can be no hot-plate damage from the boiling over of any food.

At the same time, with other features of the invention incorporated therein, an electric stove can be provided having a built-in toaster of novel and valuable type, and also, if desired, having a new type boiler, giant toaster or the like, which, for instance, can broil both sides of a steak or similar article at one time, with such article held in horizontal, vertical or other position; all according to an arrangement whereby both the temperature and duration of heat application can be absolutely controlled.

The present stove is the only one which will provide indirect or non-contact heating such as commonly employed in double boilers. In ordinary cooking such as roasting, baking and boiling, the cooking heat can be applied either all directly, or partially directly and partially indirectly.

Another feature of the invention is the provision of simple, rugged, inexpensive and absolutely reliable means, readily manually or automatically operable, preferably from the exterior of the stove, for moving a heating unit from a normal or inoperative position to any one of a plurality of preselected operating positions according to the type of cooking desired, cooking utensil employed or desired manner of application of the cooking heat.

As will become clear hereinafter the present stove constitutes a new method of cooking.

Other objects and advantages of the invention will be hereinafter referred to or become apparent.

The invention will be clearly understood, and the various features and advantages thereof fully appreciated, from the following detailed description of a now preferred one of the many possible embodiments of the invention, as shown by way of exemplification of the invention in the accompanying drawings.

Figure 1:
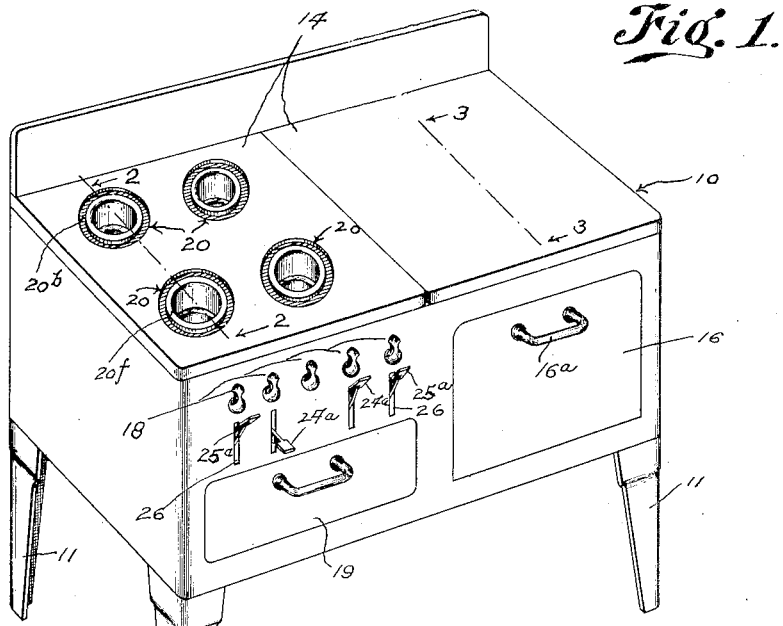
Fig. 1 is a perspective view of said embodiment.

Referring now in detail to the stove structure shown in the drawings in exemplification of the invention, and referring first to Fig. 1, the type of stove selected for illustration here is according to a conventional design so far as is concerned the inclusion of a main body 10, supported on legs 11, and with such body having at one side thereof a plurality of "burners" facing upwardly toward the stove top 14, and at the other side thereof an oven compartment (15, in Figs. 3 and 4) having a bottom hinged door 16 provided with a handle 16a. Also as is conventional, the stove structure shown includes, adjacent to said burners, manual controllers 18, each for serving one of the burners, in regard to turning on or off the heat to be delivered from a burner. Further as shown, the stove can include the usual storage slide-drawer 19.

As will be understood, since the stove of the present invention is an electric stove, said burners are heat supplying devices each including electric conductors of high resistance, commonly known in the art of electrical heating as resistance elements; and the controllers 18, or any equivalents thereof, are for operating individual switches, each serving one of the burners, to close or open the circuit for the resistance elements provided at the different burner locations.

In other respects, however, the new stove, as will be seen from what follows, is a radical departure from previous proposals.

For reasons which will become clear in a moment, said burners will hereinafter be called the heating wells, as each of said wells, marked 20, is utilized in the embodiment shown as a housing or receptor for a heating unit (that is, a unit incorporating one or more resistance elements) for that well, and also as an open topped chamber, or true well, for transmitting heat from said unit to a receptacle for food to be cooked, with said receptacle partially extended down into the well, or, in certain cases, with said receptacle placed to have its bottom close the top of the well. And in aid of clarity of expression, said controllers 18 will hereinafter be called the switches. With the stove including four wells 20 and a single oven 15, as here illustrated, five switches 18 would desirably be present, one, say that one shown at the middle in Fig. 1, for serving the oven 15, and each of the other four for serving one of the wells 20.

The case last-mentioned, that is, where the receptacle would have its bottom close the top of a well, is probably the least usual one, although sometimes desirable, where exceptionally large receptacles are occasionally used. Such a receptacle is indicated in dot-and-dash lines at R in Fig. 2. As to an even larger receptacle, this could be arranged so that its bottom would close over the tops of two or more wells 20, with the heating units in said wells simultaneously operative, that is, heated by the passage of electric current through their resistance elements.

Figure 2:
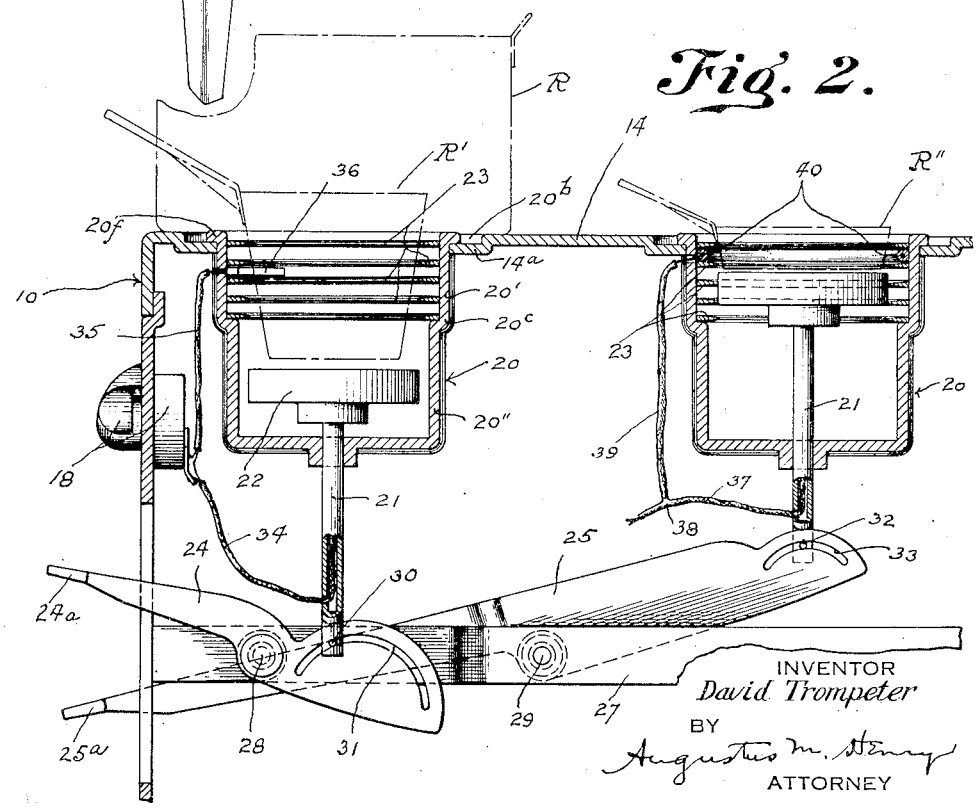
Fig. 2 is a fragmentary vertical section, on an enlarged scale, taken substantially along the line 2—2 of Fig. 1.
Figure 5:
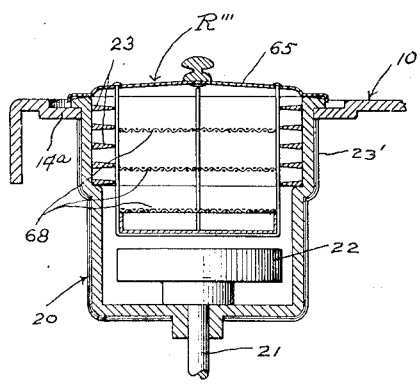
Fig. 5 shows one of the cooking wells of Fig. 2, but with a receptacle therein, for holding the articles to be cooked, which is a baker or broiler, as contradistinguished from the cooking pot shown in dot-and-dash lines in Fig. 2.

Most frequently, however, the receptacle, whether a pot such as indicated at R' in Fig. 2, or a frying pan such as indicated at R'' also in Fig. 2, or a foraminous receptacle such as the one shown at R''' in Fig. 5, and so on, would be partially extended down into the well.

Comparing Figs. 1 and 2, it will be noted that in the stove construction shown, each well 20 has a top annular flange 20f the upper surface of which is flush with the upper surface of the stove top 14; and that by means of this flange the well itself is suspended from the stove top 15, with the bottom of said flange resting on the upper surface of a depressed annular seat marked 14a in Fig. 2, integral with the stove top 14. Practically the entirety of the well is thereby hung within the main body 10 of the stove. In view of the fact that the bottom of the well is apertured for the passage therethrough of an endwisely movable substantially vertical rod-like carrier 21 for the heating unit 22 of the well, and in view of the fact that while on the one hand such carrier should be loose enough in said aperture to allow of easy endwise movement thereof yet not so loose in said aperture as to allow of loss of appreciable heat by way of the aperture, it is preferred positively to secure each well 20, desirably at the lapped portions of a flange 20f and its seat 14a, and by any suitable means not shown, rather than to depend merely on the weight of the well to hold the same in place.

Figure 8:
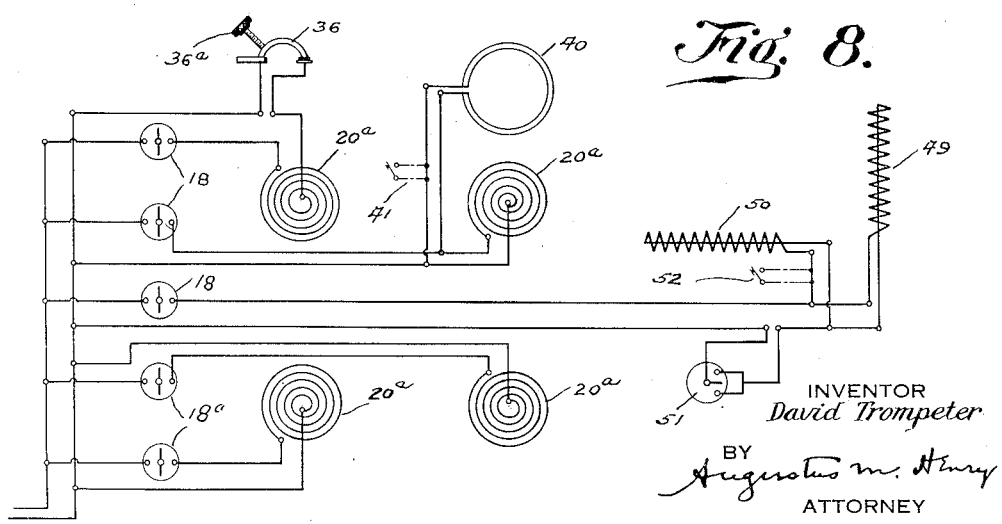
Fig. 8 is a schematic view, showing circuit connections according to a wiring diagram now favored.

Each well 20, as shown, is generally made up of an upper cylindrical portion 20', and a lower cylindrical portion 20'' of somewhat reduced diameter. The heating unit 22 of a well 20 is here shown as movable up and down in the well, to have the resistance element or elements thereof at any desired level in the well. In the present case, as indicated in Fig. 8 at 20a, each unit is provided with a single resistance element in the form of a flat spiral. Where, as here shown, a well is provided having an open top, that is, one in regard to which a receptacle for an article to be cooked is to be laid over the top of the well or partially inserted down into the same, as aforesaid, the resistance element 20a for a heating unit 22 is carried at the top of such unit, which latter is desirably of circular shape in plan to conform to the cylindricity of the cylindrical well now favored and here employed as above described. According to the varying conditions, as to the type of cooking desired, the cooking utensil employed, or desired manner of application of the cooking heat, the heating unit 22 of a well 20 will be arranged at different elevations along the height of the well—for instance, at the location shown to the left in Fig. 2, at the location shown to the right in Fig. 2, or otherwise. Normally, that is, when a particular well is not in use, or when such a receptacle as that indicated at R''' in Fig. 5 is employed, the heating unit 22 will be all the way down in the well; according to present preference.

For purposes of maximum heat economy, the outer surfaces of a well 20, below its seat 14a, are desirably covered with asbestos or some other suitable heat-insulating jacket as indicated at 23' in Fig. 5.

Between the upper and lower cylindrical portions 20' and 20'' of a well 20, there is formed, inside the well, an annular ledge marked 20c in Fig. 2. On this ledge rests the lowermost one of a series of substantially horizontal, suitably vertically spaced, and substantially parallel, annular baffle members 23. Said members are preferably as just described, and also preferably identical, so that a vertical opening is provided throughout the length of the upper portion 20' of the well which is of skeletal cylindrical character; so that when a cooking receptacle of the usual shape, that is, of upwardly flaring conical form, as illustrated in the case of the pot R' and the frying pan R'', is lowered into the well, it will seat itself, at some peripheral line between its top and bottom, snugly in the opening in the top annular baffle member 23, and there come to rest by gravity, and thereby seal over the top of the well at the level of the baffle member last referred to. At the same time, the portion of the receptacle below said baffle member, will be somewhat spaced from the opening in the baffle member next below the top one, will be more spaced from the baffle member next below, and so on, down to the bottom of the receptacle. The pot R' is shown as having its bottom below the lowermost baffle member 23, while the frying pan R'' is shown as having its bottom not far removed from the baffle member 23 below the topmost such member.

As will be noted, the heating unit 22 at the left in Fig. 2 is at a low level in its well 20, but at somewhat greater vertical spacing from the bottom of the receptacle R', than such spacing of the heating unit 22 to the right in Fig. 2 from the bottom of the receptacle R'', which latter unit is high in its well 20 because of the shallowness of the frying pan constituting the receptacle last-mentioned.

Any suitable means may be employed for raising and lowering as desired any heating unit 22 in any well 20. One such means, now favored and herein illustrated, is shown in Figs. 1 and 2. Such means includes, for each of the two wells 20 shown in Fig. 1 at the front of the stove, a shorter lever 24, and for each of the two wells 20 shown in Fig. 1 at the rear of the stove, a longer lever 25. However, all four of the levers are similar in that each has an arm terminating in a thumb-piece 24a or 25a, each such arm extending through a vertical slot 26 in the front wall of the main body 10 of the stove. As best shown in Fig. 2, each pair of levers 24 and 25, serving a line of wells extending between the front and back of the stove, is pivotally mounted on a transverse bar 27 suitably secured in place inside the stove; such lever 24 being thus mounted at 28, and such lever 25 being thus mounted at 29. The inner arms of these levers have pin-and-slot connections with the lower ends of the carriers 21 for the heating units 22 to be raised and lowered by rocking of the levers. The carrier 21 at the left in Fig. 2 is shown as having a pin 30 including a curvilinear slot 31 carried by the inner arm of the lever 24; and the carrier 21 at the right in Fig. 2 is shown as having a pin 32 engaging a curvilinear slot 33 carried by the inner arm of the lever 25. Thus, when all the thumb-pieces 24a are arranged at the upper ends of their slots 26, all the heating units 22 for all the wells will be at lowermost positions therein; while by variously depressing thumb-pieces the various heating units may be set at desired different levels in their different wells.

The carriers 21 are shown as hollow, that is, formed as sleeves, for housing lengths of cables carrying the current supply and return wires relative to the resistance elements 20a. In the case of the well 20 at the left in Fig. 2, such cable, marked 34, goes to the appropriate switch 18, while also electrically associated with said switch (as will be explained later in connection with Fig. 8) is another cable 35 leading to a thermostatic element 36 for supervising and controlling the electrical operation of the associated heating unit 22 to maintain the desired cooking temperature relative to the receptacle R'. In the case of the well 20 at the right in Fig. 2, the cable partially housed in the carrier 21, such cable marked 37, on its way to the proper switch 18, joins at the point 38, a cable 39 carrying wires leading to and from a resistance element 40, also as will be explained in connection with Fig. 8.

Referring at this point again passingly to Fig. 8, these elements 36 and 40 are in this view illustrated respectively as serving the two wells shown in Fig. 2, that is, the two wells associated with the two resistance elements 20a seen at the top left and top right in Fig. 8.

As illustrative of the fact that in practicing the invention one or more instead of none or all the wells 20 can be supplied with an automatic heat regulator, as a thermostatic element or equivalent, of any desired type, yet to simplify the drawings, a thermostatic element 36 is shown as associated merely with the well indicated at the top left in Fig. 8. Conveniently, such a thermostatic element is of the arcuately deformable bimetallic kind, adjustable by a set-screw 36a, and in series with the resistance element 20a of the heating unit 22 which said resistance element serves.

As illustrative of the further fact that in practicing the invention any suitable plurality of heating units in any suitable spatially related locations can be used with any well 20, yet to simplify the drawing, only one element 40, which is to act as a heat-delivering resistance element coadjuvant to a heating unit for a well, as indicated at the top left in Fig. 8, and which element 40 can be of the illustrated or any suitable type, is shown, in association merely with the well last referred to. This resistance element is further illustratively shown as in the form of a substantially closed circle, set at a fixed location rather high (see Fig. 2) in its well 20—as between the topmost baffle member 23 and the baffle member therebelow. It will be noted that the annular recess provided between these two baffle members provides a convenient receptor or pocketing means for the element 40. As may not have been before mentioned, the various baffle members 23 are preferably fixed, in any suitable or convenient way, at their appointed levels in the well wherein they are placed.

Further illustrative of that one of the concepts underlying the present invention, according to which a plurality of different heat-delivering resistance elements for any well, or, indeed, for any other cooking compartment, appliance or device equipped with an electrically functioning heat-source and to form part of the complete new stove combination, however such stove may be embodied, can be individually controlled, either as to operative or inoperative condition, or as to heat-delivering power when in operative condition, the annular resistance element 40 is shown as interposed in a shunt or parallel circuit with the resistance element 20a with which it is associated (the resistance element 20a at the top right in Fig. 8); and such shunt circuit is shown as including a special switch 41, additional to that switch 18 for throwing the resistance element 20a last-mentioned into and out of circuit, for opening and closing said shunt circuit.

A feature of the invention is the provision, as for use in an electric stove combination, of such a cooking compartment, appliance or device as referred to in the preceding paragraph, but one of novel character and exceptional utility. In this connection, refer to Figs. 1, 3 and 4, where an arrangement of the kind just described, employable, for instance, as a giant toaster (that is, say for slow toasting at once a large number of bread slices), a broiler, or otherwise, is illustrated according to a now favored way of practicing this feature of the invention.

In the present case, said appliance is shown as including the oven door 16, which door, as aforesaid, preferably is a bottom-hinged one.

According to the exemplifying structure shown, this hinge, marked generally 42, is made up of a pintle or pintles 43, in combination with leaves 44 carried at the bottom of door 16 and complementary leaves 45 carried by a member 46. The door 16 and said member 46, as will by now have been noted, are both really casings or boxes, and will hereinafter be referred to, respectively, as the door-box 16 and the cover-box 46—since, in one aspect of the combination, the latter box acts as a cover relative to the former box. (As the situation may perhaps be better expressed, the door-box 16 and the cover-box 46 together constitute a pair of hingedly interconnected casing-halves, which when brought to superposed condition as in Fig. 4 form a completely closed and if desired a substantially hermetically sealed cooking compartment 16—46.)

Figure 4:
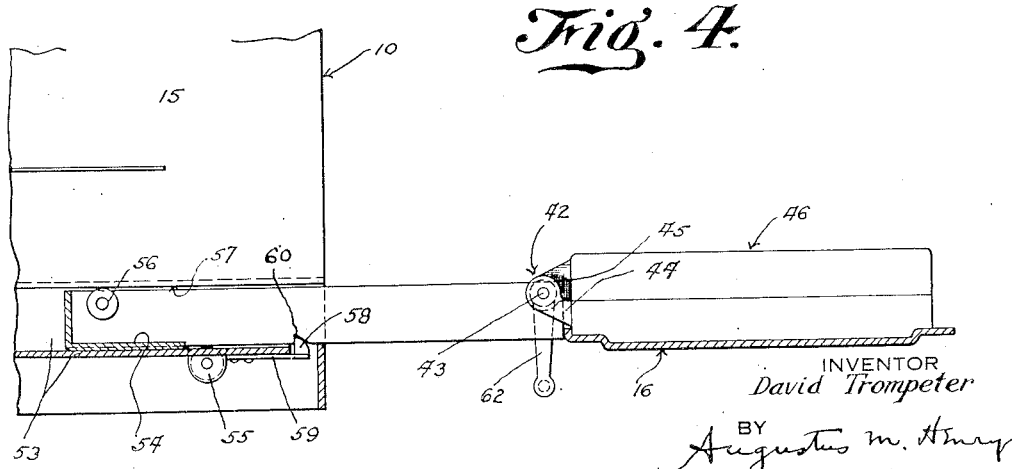
Fig. 4 is a view similar to Fig. 3, but showing the parts of Fig. 3 in one possible rearrangement.

Each of these casing-halves 16 and 46, at its side which faces a side of the other when both are brought together as in Fig. 4, is provided with a shallow pan 47 or 48, of suitable material and structure over its bottom, as by being made foraminous, or of say some metal of high heat radiation capacity. As will be understood, when the parts are arranged as in Fig. 2, these two pans abut at their rims, thereby to provide a compartment half the thickness of which is furnished by the depth of each pan. In such a compartment, the food to be cooked is placed, of course, before the casing is closed. To mention only two of the many possible uses of said casing when closed, it could be used as aforesaid as a giant toaster; or, as a broiler for one or more, or indeed a great plurality, simultaneously of steaks, chops and the like. In each casing-half 16 or 46, set in a suitable electrically insulating and head-radiating bed immediately behind the bottom of pan 47 or 48, is an electrical resistance element 49 or 50 (see also Fig. 8); while in each said casing-half, behind said bed, is a bed of asbestos or some other efficient heat-insulating material.

When ordinary heat is desired in the oven 15, with the latter used as such according to ordinary culinary practice, electric current will probably in most cases be sent only through the resistance element 49. When, however, an exceptionally high heat is desired in the oven, both the resistance elements 49 and 50 can be supplied with current. Referring at this point again to Fig. 8, a circuit arrangement is shown wherein the middle one of the switches 18, when closed, would ordinarily place both the resistance elements in closed circuit in parallel. An auxiliary switch is shown at 51, and so associated with the circuit that when open, as shown, neither of the resistance elements 49 and 50 can be energized, even on closing, say accidentally, the switch 18 last-mentioned. In the shunt circuit for the resistance element 50 is indicated, at 52, a special switch, for individually throwing that resistance element into and out of circuit. A similar such switch, although not shown, could be interposed in the parallel circuit for the resistance element 49.

Figure 3:
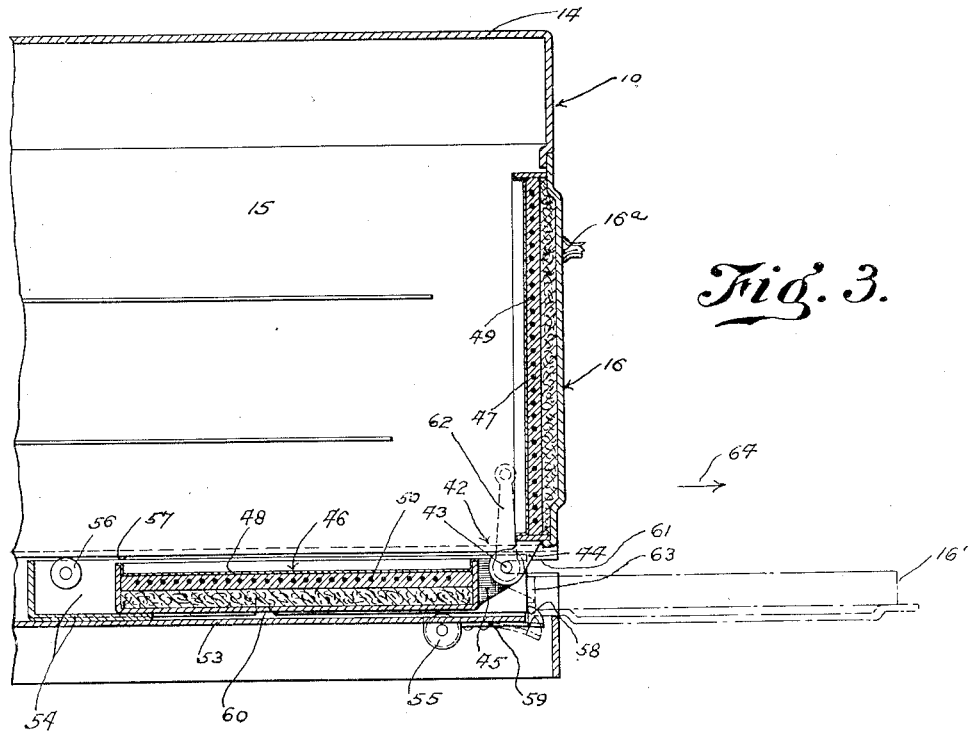
Fig. 3 is a view similar to Fig. 2, being a vertical section taken substantially on the line 3—3 of Fig. 1; one of the parts here being shown in one position in full lines, and in another position in dot-and-dash lines.

When it is desired to utilize the casing-half 16 and 46 in coaction with each other, to provide a giant toaster, broiler or the like in accord with the principles of the invention, it is desirable to provide some means, and preferably mechanical means, for facilitating such use; and such a mechanical means, of a type now favored, is shown in Figs. 3 and 4.

Referring in this connection to these views, fixed in the lower portion of oven 15 is a substantially horizontally extending guideway 53, desirably in the form of a channel-plate, the U-cross-section of which is one with the U upright; such plate of a width somewhat exceeding that of the casing-half 46. A box-type slide 54 rides in this guideway, resting at a forward point along its bottom (with the parts as in Fig. 3) on one or more rollers 55 fixed in main body 10, and carrying near its top and near its inner end one or more rollers 56 bearing against a horizontal guide means 57. Thus, following a lowering of the door 16 to its broken line position shown at 16' in Fig. 3, said door may be moved bodily outward to its position shown in Fig. 4.

In order to retain the parts as in Fig. 3, that is, with the door 16 swingable only between its full line, closed position, and its broken line, open position, 16', a latch-lock is provided in the form of a dog 58, resiliently mounted on a leaf spring 59, secured to the bottom of channel-plate 53. By such spring the top latching end of the dog is urged upward, so as to engage the forward end of the slide 54 when the parts are as in Fig. 3, or to enter a notch 60 in the bottom of said slide when the parts are arranged as in Fig. 4.

Normally, as soon as the slide 53 is ever returned from its position in Fig. 4 to its position in Fig. 3, the dog 58 snaps to its full line position in Fig. 3, and so locks the pintle-means 43 in proper position to allow opening and closing of the door 16 as though it were an ordinary oven door, by use of its handle 16a.

Said pintle-means 43 is desirably a single pintle, or rod, extending through all the hinge-leaves of the hinge 42. The main body 10 of the stove is slotted as at 61 for the reception of such rod when the parts are as in Fig. 3.

Whenever it is desired to use the casing 16—46 as a cooking appliance, means are provided for adapting the combination to this purpose, such means including a means for then automatically releasing the dog 58 from its engagement with the front end of the slide 54. Fixed to the rod 43 constituting the pintle of the hinge 42, to which rod are also fixed the hinge-leaves 45, is a handle 62 on the exterior of the main body 10. Said handle carries offset therefrom an ear 63, the latter so shaped and positioned that when the handle 62 is lowered somewhat from its position shown in Fig. 3, enough slightly to tilt upward the casing-half 46, the ear 63 bears down on the dog 58 and frees the slide 54 for outward travel along the channel-plate 53 in response to pull on the handle 62 in the direction of the arrow 64. Such pull brings the slide 54, and with it the casing-half 46 (still in the slide as in Fig. 3), to the position shown in Fig. 4; the dog 58 then snapping into the notch 60. The oven-door or casing-half 16 having been lowered by its handle 16a to the position 16' of Fig. 3, before or after the operations just described, the arrangement is now such that the casing-half 16 is positioned as in Fig. 4, while the casing-half 46 still is as in Fig. 3 but much projected beyond the oven 15.

As soon as the article or articles to be cooked in the appliance 16—46 are laid in the pan 47 of the casing-half 16, the handle 62 is swung in a clockwise direction through substantially 180°, thereby arranging the parts as shown in Fig. 4.

The article or articles now confined in the casing 16—46, can be toasted, broiled or otherwise cooked, and in a manner to seal in in a new way their natural juices and flavors, by energizing one or both of the resistance elements 49 and 50, by use of the control already explained.

During such cooking the casing 14—46 can be horizontal, as illustrated, or said casing can be vertical—that is, with the casing-half 16 as in full lines in Fig. 3 but with the casing still closed; or the casing can be extended at any angle desired, as by the use of any suitable adjustable settable means not shown.

When the casing parts are as in full lines in

Fig. 4, the casing-half 46 may rest merely by gravity on top of the casing-half 16.

For holding these parts together when extended at any selected angle to the horizontal, they can be clamped or locked together by any suitable means not shown.

Where the walls of the oven 15 are covered with heat-insulating means, as is desirable, greater economy of current consumption, and faster cooking, can be obtained by having the closed casing vertical, that is, with the entire casing constituting an oven closing door.

Reverting now to the wells 20, as the latter are here shown, it has already been pointed out that the top surface of the flange 20f of a well 20 is flush with the upper surface of the top plate 14 for the stove. It has not heretofore been pointed out, however, that the outside diameter of said flange is appreciably smaller than the outside diameter of its seat 14a. This provides an annular trough 20b (Figs. 1 and 2) surrounding the peripheral limits of said flange, and within the area of its seat, for acting as a receptor, and if desired as a part of a spill-away means, for liquid accidentally boiling over from the food contents in a receptacle while such food is being cooked with the receptacle placed over or projected down into the well.

This feature of the invention provides absolute insurance against any possibility of boiling-over damage to a unit 22 or any hot-plate element.

As has already been explained, a receptacle, as the receptacle R, which during the cooking has its bottom overlying a well 20, closes the top of such well tightly—this due to the flush relation between the upper surface of the top plate 14 of the stove and of the flange 20f of the well; and a receptacle, as any other of the receptacles shown, which during the cooking is partially projected down into a well 20, tightly closes the upper end of the well by snug peripheral engagement with the opening through the uppermost baffle member 23.

Due to these arrangements, and the coaction of the baffle members with each other and with the other parts associated therewith, and the insulation shrouding all over the exterior of the well, an economy of current consumption can be had—a similar economy being characteristic of the giant toaster, broiler or the like of Figs. 3 and 4 as already described—which amounts in actual figures to a saving of at least about one-half of the usual heating cost in any electric stove as previously constructed.

It will be noted that in the case of any one of the receptacles shown partially extended down into a well 20—except the receptacle R''' of Fig. 5, the various baffle members 23 at their central openings are spaced more and more away from the receptacle in a direction downward of the well. This has been found to give more efficient use of the heat generated, and a better distribution thereof relative to cooking action of the food articles in a receptacle. As to said receptacle R''', this is a foraminous one, as aforesaid, and so if desired it can be cylindrical instead of conical, as shown, because of its pervious walls, as these allow the baffle members 23 to act as intended in regard to a conical vessel. Said receptacle R''', it will be noted, can also be constructed in such way that when it is extended down into a well 20, a part thereof can completely close over the top of the well; thereby to seal in and trap within the well, as in the other cases described, substantially all the heat generated in the well from the one or more resistance elements functioning therein. This receptacle part is here shown as an impervious spun-metal cap 65 having a marginal flange 66 with a down-bent marginal lip 67 for nicely-fitting engagement with the flange 20f of a well 20.

Receptacle R''' is illustrative of a vessel of a previously known type having therein a plurality of foraminous trays 68, each for carrying articles to be baked, as potatoes, pies, cakes, puddings, etc. At its bottom, such receptacle can be provided with a pan 69, as for collecting or heating vegetable or meat juice or other food liquid.

Another feature of the invention is that the trapped and sealed in heat in a well 20 can be in the main directly applied, or largely indirectly applied, or both directly and indirectly applied in varying proportions to the food in a receptacle over or extended down into a well, by properly setting the height of the heating unit 22 for that well. For instance, at the left in Fig. 2, the heat from such a unit is shown as being practically all directly applied to the bottom of the frying pan R', and in Fig. 7 the heat from the unit 22 there seen is shown as being practically all directly applied to the contents of the receptacle $R^x$ there shown.

Figure 6:
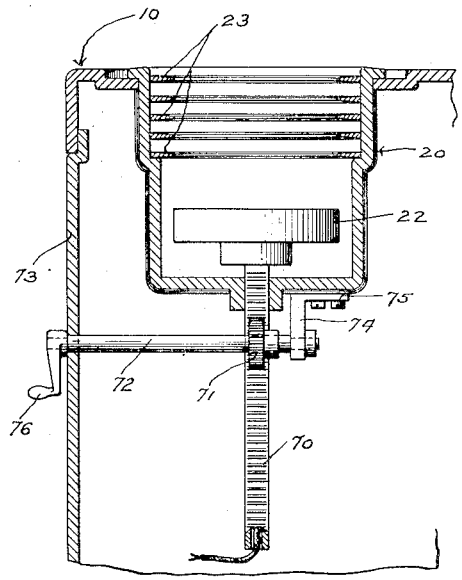
Fig. 6 is a view corresponding approximately to the left-hand side of Fig. 2, but showing a modified form of means raising and lowering a heating unit relative to the bottom of a cooking well.
Figure 7:
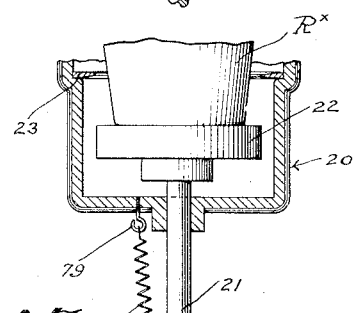
Fig. 7 is a view similar to Fig. 6, but showing another modified form of the means last-mentioned.

Referring now briefly to Figs. 6 and 7, these illustrate other possible ways of embodying a means for raising and lowering a heating unit 22 in its well 20.

In Fig. 6, the carrier for the unit 22, is shown as a rod like the rods 21 of the other views, but with such rod along its length at one side thereof shaped to constitute a rack 70. Meshing with this rack is a spur pinion 71 fast on a shaft 72, journalled at 73 in a vertical wall of the main body 10 of the stove, and also in a bracket 74 secured at 75 to the bottom exterior of the associated well 20, and also having fixed thereon an operating handle 76 at a suitable point exteriorly of said body 10.

Referring finally to Fig. 7, the carrier for the heating unit here shown is a carrier 21, but instead of said carrier being provided with a pin as in Fig. 2, it has at its lower end an eye 77 for anchoring one end of a contractile coil-spring 78, the other end of which is secured to a similar eye 79 carried by the bottom exterior of the associated well 20. This may be described as an elementary showing of a counterbalancing arrangement. In other words, normally, that is, when the well is not in use, that is, when no receptacle with a food load is on the heating unit 22, the spring 78 maintains the heating unit at the top level of the well. When, however, such a loaded receptacle is placed on said unit, the total weight then acting against the spring 78 is sufficient to cause the unit 22 to descend in its well until the receptacle $R^x$ peripherally engages and tightly seals the central opening in the uppermost of the baffle members 23. As this arrangement has so far rudimentarily been described, it provides only for direct heating of the contents of the receptacle. If desired, suitable means not shown may be provided, such as a means similar to the rack and pinion means of Fig. 6, for manually further lowering the unit 22 of Fig. 7, after the receptacle is arrested by engagement with a baffle member 23, to vary as desired the spacing between the bottom of the receptacle and the top of the unit 22.

By way of a concluding summary of some although not all of the advantages of the invention not hereinbefore referred to, it may be well to emphasize here:

(a) In boiling, economic operation is particularly striking. A current saving of approximately eighty per cent is obtained. Once a food to be cooked by boiling is brought to a boil, very little heat is required to maintain the ebullition. The residual heat trapped and retained in a well 20 and about a receptacle thereon or projected down thereinto, with very little boosting, maintains the boil. As is of course well understood, the greater part of the heat ordinarily used for maintaining a boil, is actually used, or rather dissipated, by conversion of the boiled liquid to vapor.

(b) Considering the device of Figs. 3 and 4; When used as a giant toaster, the bread is toasted on both sides at once, saving considerable of the nutriment of its inner moist mass. There is no need to buy a separate toaster, as what is here provided is equivalent, in speed of toasting and capacity of output of toast, to many expensive electric toasters. Thermostatic control, when desired, is applicable to the appliance of the present invention now being discussed, in accordance with the principles explained in connection with a well 20.

(c) For small baking in a small family, a special-insert oven can be fitted into a well 20. An example of such an oven is the receptacle R''' of Fig. 5.

(d) With the electric stove of the present invention, all need for double boilers or steam cooking, as properly to cook oatmeal, rice or other cereals which to be properly cooked should be steam cooked, or for cooking stews or any food which to be properly cooked must be slowly cooked, are done away with. For restaurant use, the new electric stove provides a complete cooking and steam-table unit all in one.

(e) Since practically always, as hereinabove pointed out, a receptacle supplied with heat from a well 20, is during the cooking extended down into said well, there is absolute insurance that neither a pot nor a pan can be accidentally pushed from the stove or upset, as by a child, with the danger of scalding the latter.

(f) Not only does the new stove provide, in regard to a cooking well constructed according to the principles of the invention, a means for confining and heating the air surrounding the pot, but an arrangement such that the temperature of this surrounding air can be supervised and controlled or governed, exactly and absolutely.

(g) The new stove can be set for a given temperature, and maintained at this temperature over any length of time desired, at one or more of the wells 20 or equivalents, regardless of what type of receptacle is used with such well or how such receptacle is engaged with the well, provided only that the feature of the invention whereby the top of the well is closed over and sealed tight, is utilized. Should the housewife choose to arrange one or more pots on the stove for cooking food in such pots, and then leave the house for several hours, she will be assured that none of the food will ever burn. Simmering will continue for as many hours intended, and the temperature will never rise above that predetermined. Thus, the new stove, in addition to all of its other advantages, also incorporates the features of what is commonly known as a fireless cooker.

Considerable particularities of description, as to materials, dimensions, capacities, utilities and preferences may have been herein indulged in, but it will be understood that these statements, made with particular reference to that one, and the one now preferred, of the many possible embodiments of the invention which is illustrated in the drawings, are not in any way to be taken as definitive or limitative of the invention. That is to say, it is intended that all matter contained in the above description or shown in the accompanying drawings shall be interpreted as illustrative and not in a limiting sense.

Modifications and variations may be made within the invention, and parts of the improvements may be used without others.

And as will be understood, the scope of protection contemplated is to be taken solely from the appended claims, interpreted as broadly as is consistent with the prior art.

I claim:

1. In an electric stove, the combination of a structure providing a deep recess or well; a heating unit therein; means for moving said unit in the well to affect operation of said unit in the well to adapt the same to a prevised kind and rate of cooking; a plurality of baffle members in the upper part of the well one spaced above another; a means for modifying the heating action of said unit; and a thermostatic means in heat-exchanging relation with the well for controlling the operation of said modifying means.

2. An electric stove as in claim 1, in which the stove has a substantially horizontal top wall provided with a depressed portion having an opening smaller than such depression and surrounding the upper part of the well; the top of the well is above said opening and substantially flush with the upper surface of the stove top; and the well has a laterally outwardly directed projection near its top lying over a part of said depression and forming part of a means for suspending the well from the stove top and for providing a sunken recess in the stove top alongside the well top, with said recess defined in part by said projection and in part by said depressed portion of the stove top.

3. The combination, in an electric stove, of a structure providing an open-top well; and means for rimming the well on its inside and near its upper end, said rimming means including a plurality of annular baffle rings one spaced above another, said rings being substantially horizontally disposed, substantially of the same inside diameter, and substantially concentrically arranged.

DAVID TROMPETER.